(12) United States Patent
Brady

(10) Patent No.: US 6,390,845 B1
(45) Date of Patent: May 21, 2002

(54) ELECTRICAL CONNECTOR FOR A PORTABLE RADIO

(75) Inventor: Jeffrey Francis Brady, Raleigh, NC (US)

(73) Assignee: M/A-COM Private Radio Systems, Inc., Lynchberg, VA (US)

( * ) Notice: Subject to any disclaimer, the term of this patent is extended or adjusted under 35 U.S.C. 154(b) by 0 days.

(21) Appl. No.: 09/757,551

(22) Filed: Jan. 10, 2001

(51) Int. Cl.[7] .................. H01R 13/62; H01R 13/64; H01R 39/00
(52) U.S. Cl. ........................... 439/372; 439/13
(58) Field of Search ................. 439/13, 11, 372, 439/14; 455/89, 68, 186

(56) References Cited

U.S. PATENT DOCUMENTS

| | | | |
|---|---|---|---|
| 3,971,460 A | * 7/1976 | Gay-Chatain et al. | 191/45 |
| 4,255,007 A | 3/1981 | Michaels et al. | |
| 4,550,967 A | * 11/1985 | Riches et al. | 339/88 |
| 4,792,986 A | * 12/1988 | Garner et al. | 455/89 |
| 5,022,861 A | * 6/1991 | Aoto | 439/13 |
| 5,038,400 A | 8/1991 | Baracat et al. | |
| 5,352,122 A | * 10/1994 | Speyer et al. | 439/13 |
| 5,685,730 A | * 11/1997 | Cameron et al. | 439/335 |
| 5,788,523 A | 8/1998 | Burnette et al. | |
| 5,851,120 A | * 12/1998 | Sobhani | 439/17 |
| 5,882,226 A | * 3/1999 | Bell et al. | 439/582 |
| 5,895,282 A | * 4/1999 | Little | 439/332 |
| 6,026,282 A | 2/2000 | Garcia et al. | |
| 6,206,714 B1 | * 3/2001 | Bernardini | 439/335 |

* cited by examiner

Primary Examiner—P. Austin Bradley
Assistant Examiner—Edwin A. León
(74) Attorney, Agent, or Firm—James H. Beusse, Esq.; Beusse, Brownlee, Bowdoin & Wolter, P.A.

(57) ABSTRACT

An electrical connector for interconnecting a portable radio and accessory devices. The connector attached to the accessory device includes a slot for initially engaging a tab on the portable radio, which provides proper alignment between the portable radio and the connector, while the connector is rotated toward the portable radio. Maintaining alignment ensures proper mating between the electrical contacts of the portable radio and the electrical contacts of the connector, and further ensures that a quarter turn latching device of the connector is properly received by a receiving member on the portable radio. The user then rotates the quarter turn latching device to urge the contacts against each other and secure the connector in place. Because the electrical connector includes a two-point attachment mechanism to the portable radio, rotation of the connector relative to the portable radio is prevented.

17 Claims, 4 Drawing Sheets

ELECTRICAL CONNECTOR FOR A PORTABLE RADIO

BACKGROUND OF THE INVENTION

The present invention is directed in general to an apparatus for connecting a radio to one or more accessory devices, and more specifically, to such an apparatus providing a reliable, robust, repeatable, waterproof and quick release interconnect.

Various types of personal radio systems, which necessarily include a portable receiving unit, are now commonplace. In some systems, the portable radio may comprise a transceiver for providing two-way communications between two individual users or between a single user and a group of other users. A base station or repeater receives a signal from the calling unit and re-transmits the signal to one or more called units.

A trunked radio repeater system is one such personal radio system in widespread use today. In the trunked system, a pair of radio frequencies is assigned to a group of public service users, such as a fire department, police department, or emergency service providers. Each radio frequency group includes an inbound working channel for carrying traffic from a user to a base station or a repeater, and an outbound working channel for carrying communications traffic from the repeater to the intended recipients. Each user is equipped with a portable transceiving unit, typically referred to as a portable radio, for communicating with members of his or her group. Generally, the portable radios are hand-held or received within a harness assembly strapped to a user so that the radio is readily accessible. The portable radio may also be temporarily stored in a pocket of the user's clothing, set upon a work surface, or used within a vehicle.

When a user initiates a call, the trunked radio system assigns a frequency pair (including an inbound working channel and an outbound working channel) to the call. Once the call has been set up, the calling party talks into the portable radio or into an accessory microphone connected to the portable radio. The voice signal is sent to the base station over the inbound working channel and then broadcast to all members of the calling party's group over the outbound working channel.

It is common practice for the radio to have a multi-pin electrical connector accessible at an external surface of the portable radio unit. A number of accessories can thereby be connected to the portable radio so as to become an integral part of the radio system. Certain of these radio accessories offer the user an opportunity to enjoy hands-free operation of the portable radio. Other accessories provide remote control operations and/or functions that may not be available within the basic portable radio. One accessory that facilitates hands-free operation is a remote speaker/microphone. The remote speaker/microphone is typically worn on the user's shoulder and connects to the portable radio through a cable and connector, while the portable radio remains attached to the harness assembly by or near the user's belt. The remote speaker/microphone brings a majority of the basic radio functions to the user's shoulder, for example, a push-to-talk button by which the user can activate the portable radio to place a call. When use of the radio is transitioned to the vehicular environment, the remote speaker microphone and related accessories can be disengaged from the portable radio at the multi-pin connector, followed by the engagement of a different accessory device for interfacing with one or more related systems within the vehicle, such as a power supply for recharging the portable radio battery, a speaker mounted within the vehicle, and a microphone also mounted within the vehicle. Depending upon the preferences of the user, accessory devices may be changed as the portable radios are swapped from one user to another. Frequent swapping, with attendant changes in accessory devices, to fatigues the interconnect system.

Typically, the portable radio user is engaged in public safety matters, such as a police offer, fire fighter, or ambulance personnel. The radio is therefore often subjected to extreme environments, such as high-pressure water flows and high stress scenarios where reliable and immediate availability of the portable radio, including proper functioning of the connector of the present invention, is extremely critical.

As discussed above, the portable radio is generally received within a harness and given the size and bulk of the radio, it is usually only semi-rigidly attached to the operator. The cord leading from the accessory device terminates in a multi-pin connector for mating with the connector of the portable radio. When the accessory speaker/microphone is mounted to the user's shoulder, the cord typically runs along the operator's body, generally from the waist to the shoulder. In the prior art, the accessory cord connector is a moderately large protrusion extending from the side of the radio when mated thereto. It is commonly bumped and subject to jarring forces from many directions during use. For instance, mechanical damage occurs most often when the user enters or exits a vehicle, door or arm chair while wearing other equipment or gear. The cord easily becomes tangled as a fire fighter crawls along a debris-strewn floor or through a small passage, or while a police officer is chasing a fleeing criminal. In short, any time the connector body comes in contact with an immovable object, it is generally the former that is damaged.

In one prior art embodiment, the accessory connector is removably attached to the portable radio by a single screw penetrating through the connector and mating with a threaded hole in the portable radio body. See for example U.S. Pat. No. 4,792,986. It is common practice for users to over tighten the screw in an effort to maintain a waterproof seal at the connector interface. Under emergency and stressful conditions, it can prove difficult to accurately align the connector (12 pins in one embodiment) with the mating holes and then actuate the screw to tighten the connector in place. Over-tightening the screw can cause it to shear, requiring replacement of the connector and perhaps a repair of the portable radio if the broken screw remains lodged in the mating screw hole. Under-tightening the connecting screw provides poor electrical connection between the connector halves.

To prevent connector misalignment during the connecting process and while in use, certain field modifications have been attempted, including the use of metal straps and hooks to hold the connector to the portable radio. The metal straps frequently snag on the user and deform out of shape. The plastic hooks eventually wear out and require replacement. In extreme situations, the prior art connector is bonded to the portable radio to prevent connector movement relative to the portable radio. These attempted prior art modifications render it difficult, and in some cases impossible, to disconnect the portable radio from a first accessory device, for instance the speaker/microphone device, and connect it to a second accessory device, for example, vehicular accessories.

Referring to the patent mentioned above (U.S. Pat. No. 4,792,986), a threaded knurled knob is used as the single point of attachment between the connector and the portable radio body. It is known that a single screw cannot prevent rotational movement of the connector relative to the portable radio Rotation through any angle greater than approximately 15 degrees causes loss of electrical connection between one or more of the contacts. If the mating electrical contacts comprise pins and mating holes, such rotation of the connector can cause bending of the pins, or in extreme cases, breaking of one or more pins. In an effort to prevent these occurrences, and under the belief that tighter is always better, users will tighten the screw as tight as possible. As mentioned above, in extreme cases the screw will shear under the extreme forces imposed upon it.

In addition to a relatively quick release electrical connector for the purpose of changing between various accessory devices such as those worn by an individual user to those carried in a vehicle, it should also be noted that certain features of the radio can be programmed through use of yet another accessory device. As explained in detail in U.S. Pat. No. 4,792,986, the portable radio senses the resistance or impedance between specified pins of the electrical connector (or between a specified pin and ground) and in this way determines the nature and function of the accessory to which the portable radio is connected. In response to the measured impedance value, the internal computer-controlled circuits of the portable radio automatically reconfigure the portable radio mode of operation. As discussed in the aforementioned patent, one of the unique resistance values identifies an external controller for reprogramming certain internal functions of the portable radio. Another unique resistance value identifies the external speaker/microphone as the accessory device connected to the portable radio. Yet another resistance value identifies the vehicular accessories.

As discussed above when the accessory connector is not tightly mated with the portable radio, rotation of the accessory connector relative to the radio body can change the resistance value or break the electrical connections between contacts. In the event the sensed resistance value changes, the portable radio will switch operational modes, although the same accessory device remains attached to the portable radio. If the operative contacts to the attached accessory device are instead broken, while the sensed contacts remain intact and with no change to the measured resistance value, the portable radio will continue to operate as though the speaker/microphone is attached. As a result, the radio controller mutes the speaker within the radio body, rendering the entire unit useless, (assuming there is no provision for manually activation of the radio speaker).

BRIEF SUMMARY OF THE INVENTION

The above-mentioned disadvantages associated with prior art connectors are overcome by the improvements offered by a connector constructed according to the teachings of the present invention. The connector includes a top catch or slot for engaging a mating tab on the portable radio. Once engaged, the connector is rotated downwardly into place, using the mated slot tab assembly as the pivot point. A quarter turn screw on the connector engages a mating receptacle on the radio and is then rotated to firmly secure the connector to the portable radio.

The mechanism of the present invention provides several advantages over the prior art connector arrangements. In particular, a connector constructed according to the teachings of the present invention offers additional strength and impact resistance to the connector, overcoming problems created by rotation of the connector when it is bumped against an immovable object. Use of a quarter turn screw serves as an indicator to the user that the screw has been properly tightened, and that no further tightening is required. Further, the use of a screw device that has only two positions, a tightened position and an untightened position, (a so-called "binary screw") avoids any mistake on the user's part that the screw is either too tight or too loose. The mating tab/slot arrangement prevents misalignment of the electrical contacts (e.g., mating connector pins and holes) during the connection process and also during use. Since there are two attachments points between the connector and the body of the portable radio, rotation of the connector relative to the portable radio is precluded.

Water intrusion to the electrical contacts is avoided through the use of a waterproof seal surrounding the contracts and further surrounded by a skirt integral to the connector body. Without a skirt surrounding the seal, water can hammer beyond the seal into the contact area, shorting contacts or changing the resistance value that determines the type of the accessory connected to the portable radio. Finally, since the portable radios are widely used by emergency and public service personnel, it is critical to have a connector providing a quick release mechanism for connection and disconnection.

BRIEF DESCRIPTION OF THE DRAWINGS

The present invention can be more easily understood and the further advantages and uses thereof more readily apparent, when considered in view of the description of the preferred embodiments and the following figures in which.

DETAILED DESCRIPTION OF THE PREFERRED EMBODIMENTS

Figure 1:
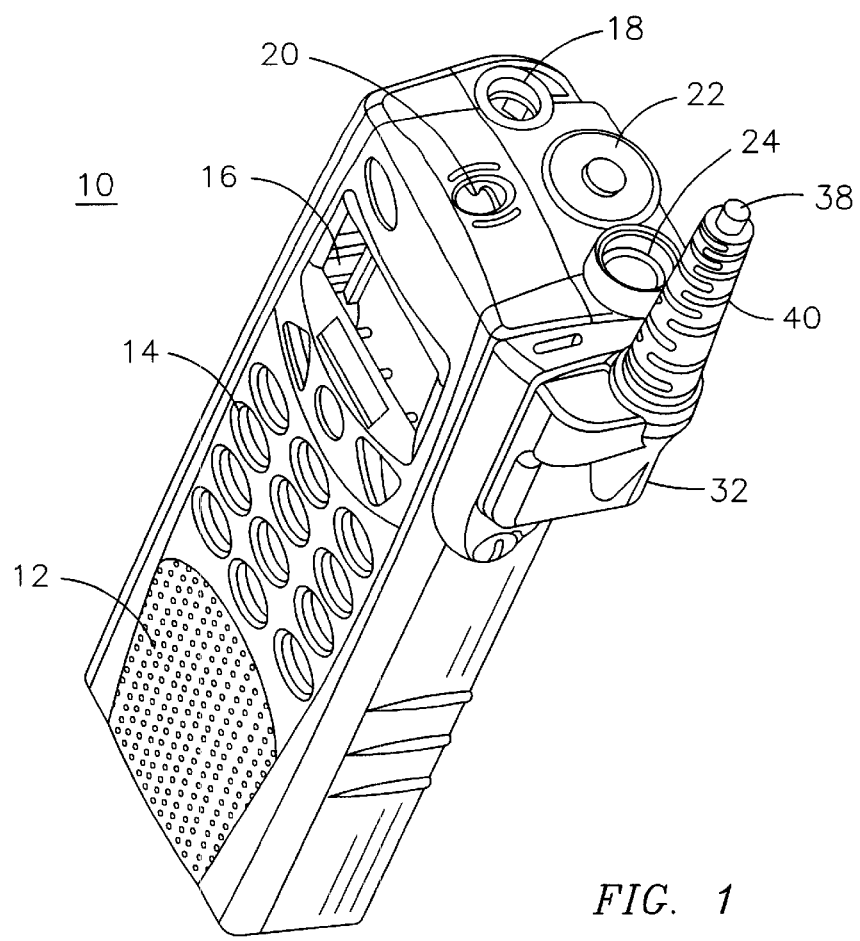
FIG. 1 illustrates a portable radio including the connector of the present invention.

Before describing in detail the particular connector in accordance with the present invention, it should be observed that the present invention resides primarily in a novel combination of elements comprising an electrical connector. Accordingly, the hardware components have been represented by conventional elements in the drawings, showing only those specific details that are pertinent to the present invention, so as not to obscure the disclosure with structural details that will be readily apparent to those skilled in the art having the benefit of the description herein.

A portable radio system, such as a trunked radio system, includes a portable radio 10 as shown in FIG. 1. The portable radio 10 includes conventional features such as a speaker/microphone 12, key pad or function control switches 14 for controlling radio functions and operations, a visual display 16, a combination volume control and on/off power switch 18, an emergency button 20, a channel control switch 22 and an antenna port 24. The portable radio 10 also includes one or more manually actuatable switches (not shown in FIG. 1) for controlling the mode of operation. The portable radio 10 is generally small enough to be hand-held and is often carried in a harness strapped to the user's body for immediate accessibility. In operation, a user activates the portable radio to an "on" condition via one of the manually actuatable switches and then manipulates the channel control switch 22 to tune the receiver and/or transmitter of the portable radio 10 to a desired frequency, which may be displayed on the visual display 16. Yet another switch may be manually activated as a push-to-talk switch in conjunction with the microphone/speaker 12. As is known to those skilled in the art, the portable radio 10 includes computer-controlled radio communications devices including radio frequency and audio frequency circuits controlled by a programmable computer and using an internal rechargeable battery supply as a power source.

Figure 2:
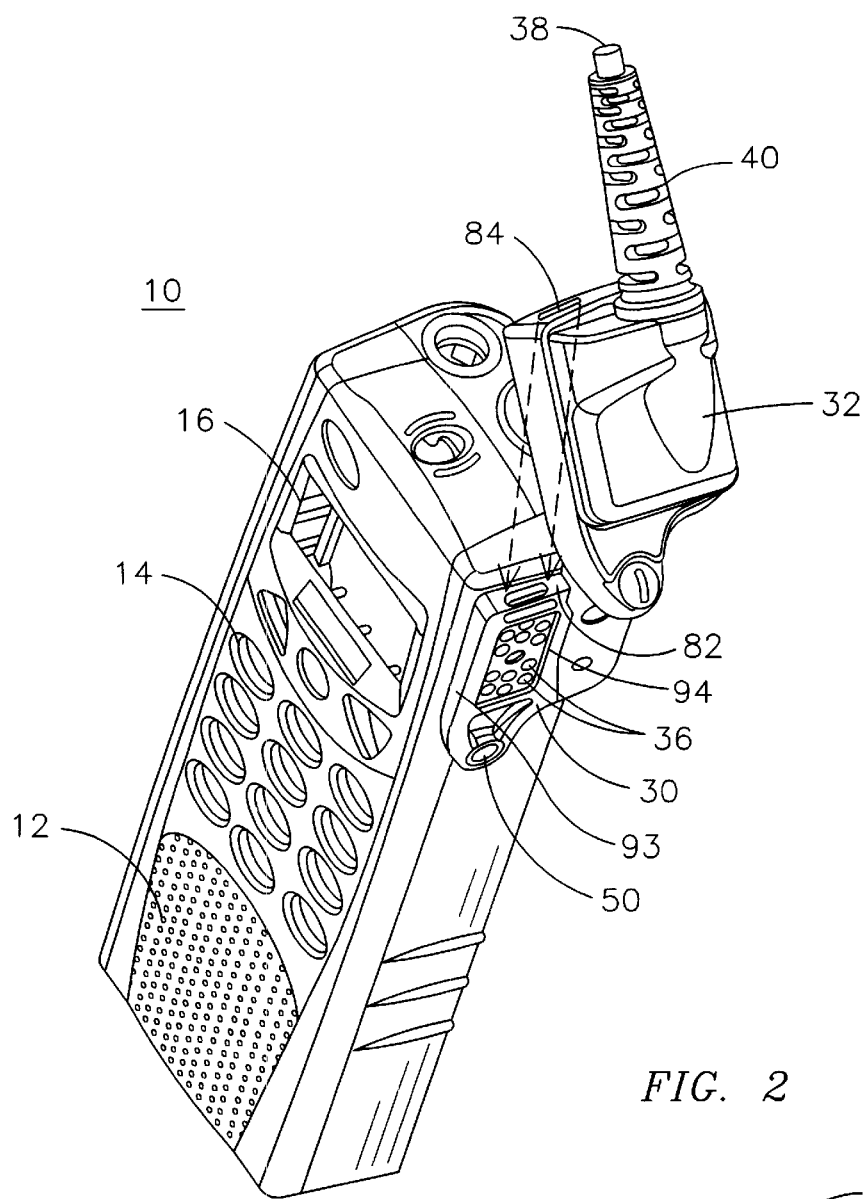
FIG. 2 illustrates the first step in the process of attaching the connector to the portable radio.

Turning to FIG. 2, there is shown an externally accessible multi-point connector 30, mated with a connector 32. Typically, the connector 30 includes a plurality of electrical contacts 36 providing electrical connection of the electrical circuits within the portable radio 10 to various accessory devices in electrical cooperation with a connector such as the connector 32. In those applications where the portable radio 10 is worn on the body of a user, the connected accessory device typically includes a speaker/microphone terminated in a connector 32 via a cable 38. For use of the portable radio 10 within a vehicle, a vehicle speaker is terminated by a connector 32. Charging of the radio batteries from the vehicle power system is accomplished via terminals on the back of the battery (not shown in FIG. 1). For testing and reprogramming the portable radio 10, a testing and reprogramming device is terminated with a connector 32 via a cable 38. As shown in both FIGS. 1 and 2, the cable 38 includes a reinforced section comprising a strain relief boot 40.

Figure 3:
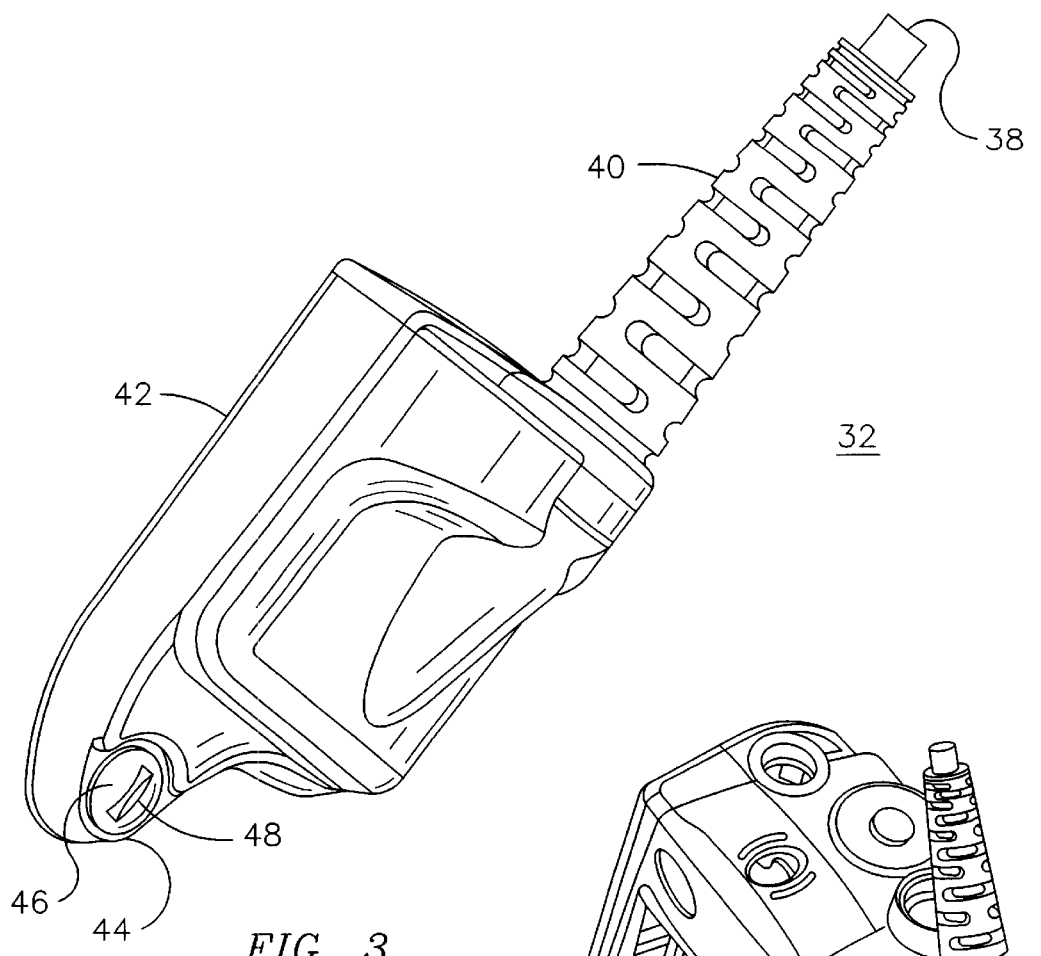
FIG. 3 is an external view of the connector constructed according to the teachings of the present invention.

FIG. 3 is an external view of the connector 32, including a connector body 42. The physical dimensions and physical features of the connector body 42 will vary dependent upon the size of the connector 30 to which the connector 32 mates and on the application in which the connector 32 is used. The connector 32 also includes a rotatable latching device 44, which in one embodiment is a quarter turn latching device, for locking the connector 32 to the connector 30 through a quarter turn torque. A head 46 of the rotatable latching device 44 includes a slot 48 for engagement with a screwdriver or coin to effectuate, in one embodiment, a quarter turn latching operation.

Figure 4:
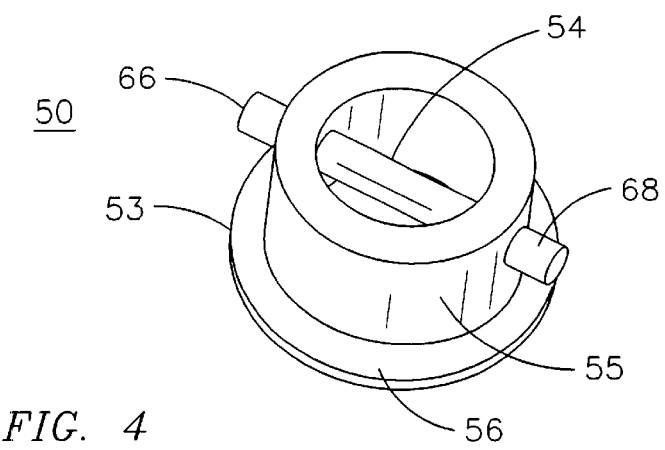
FIGS. 4 and 5 illustrate the quarter turn insertion device of the connector constructed according to the teachings of the present invention.
Figure 5:
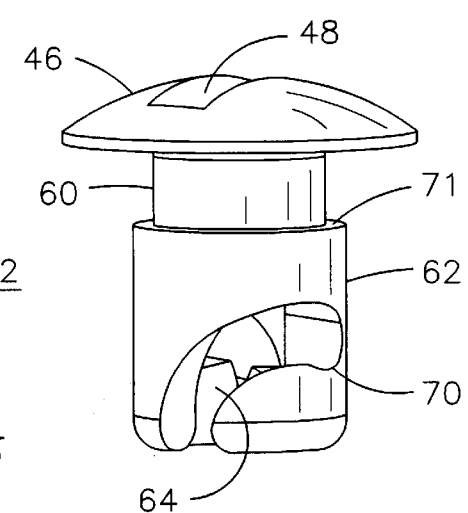

FIGS. 4 and 5 illustrate details of the rotatable latching device 44, including a receiving member 50 (see FIG. 4) and a screw member 52 (see FIG. 5). The receiving member 50 includes a body 53 and a pin 54. See FIG. 2 for the location of the receiving member 50 relative to the portable radio 10. The body part 53 comprises a hollow cylindrical portion 55 and a rim 56 attached thereto. The cylindrical portion 55 includes two oppositely disposed holes for receiving the pin 54. Protrusions 66 and 68 provide an anti-rotation feature, that is, when the receiving member 50 is mounted within the connector 30, protrusions 66 and 68 are urged against the surface of the connector 30 so that frictional forces prevent rotation of the receiver member 50 when the screw member 52 is inserted therein and rotated.

Turning to FIG. 5, the screw member 52 includes the head 46 and the slot 48. The screw member 52 further includes a barrel 60 and a sleeve 62 fixedly attached to or machined into the barrel 60. The sleeve 62 further includes an arcuate slot 64. Although only one arcuate slot 64 is illustrated in FIG. 5, the screw member 52 includes two such arcuate slots, where the second arcuate slot is on the side hidden from view in FIG. 5. The arcuate slots 64 engage the pin 54. When the head 46 is rotated, the pin 54 rides up the arcuate slot 64, forcing the screw member 52 downwardly toward a latched position. At the termination of the arcuate slot 64, there is a detent position 70. Once the pin 54 enters the detent position 70 (after rotation through approximately 45 degrees), the quarter turn latching device 44 is locked in place, (i.e., the screw member 52 is detachably locked into the receiving member 50) thus securely attaching the connector 32 and the connector 30. The differing diameters of the barrel 60 and the sleeve 62 form a shoulder 71. The connector 32 includes a hole through which the screw member 52 passes such that the surface 42 of the connector 32 is disposed between the underside of the head 46 and the shoulder 71 to retain the screw member 52 within the hole.

Figure 6:
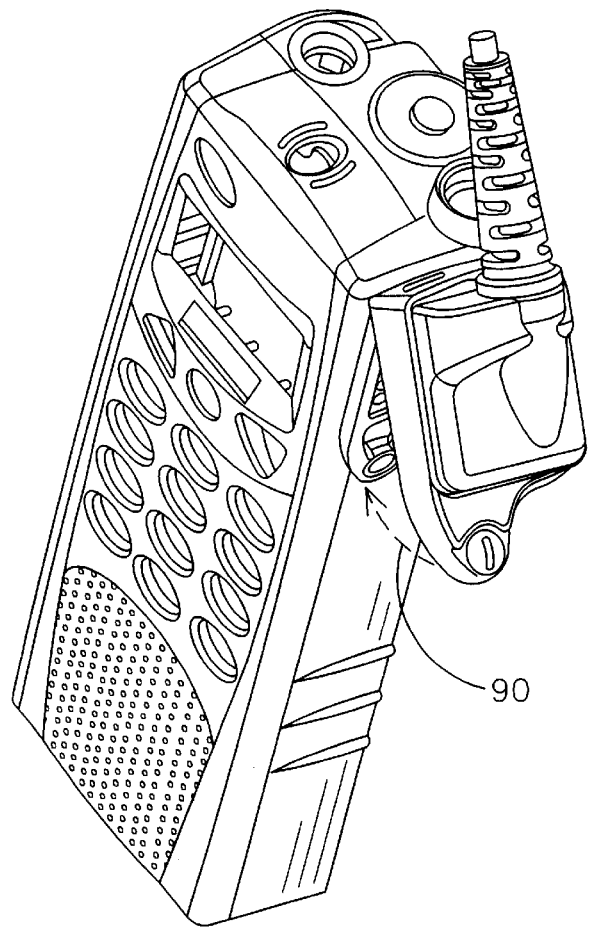
FIG. 6 illustrates the second step in the process of attaching the connector to the portable radio.

Returning to FIG. 2, the arrowheads show the initial step for engaging the connector 32 to the connector 30. The connector 32 is lowered toward the portable radio 10 so that a tab 82 affixed to the portable radio 10 engages a slot 84 of the connector 32. Referring to FIG. 6, the connector 32 is then rotated toward the portable radio 10, with the mated tab 82/slot 84 serving as the point of rotation. See an arrowhead 90. Once the connector body 42 abuts the adjoining body of the portable radio 10, the connector 32 is fixed in place by a quarter turn rotation of the rotatable latching device 44 as discussed above. In another embodiment of the present invention, the connector 32 includes two slots, such as the slot 84, one forward and the other rearward (relative to the front surface of the portable radio 10) for engaging a forward tab and a rearward tab on the portable radio 10, respectively.

Figure 7:
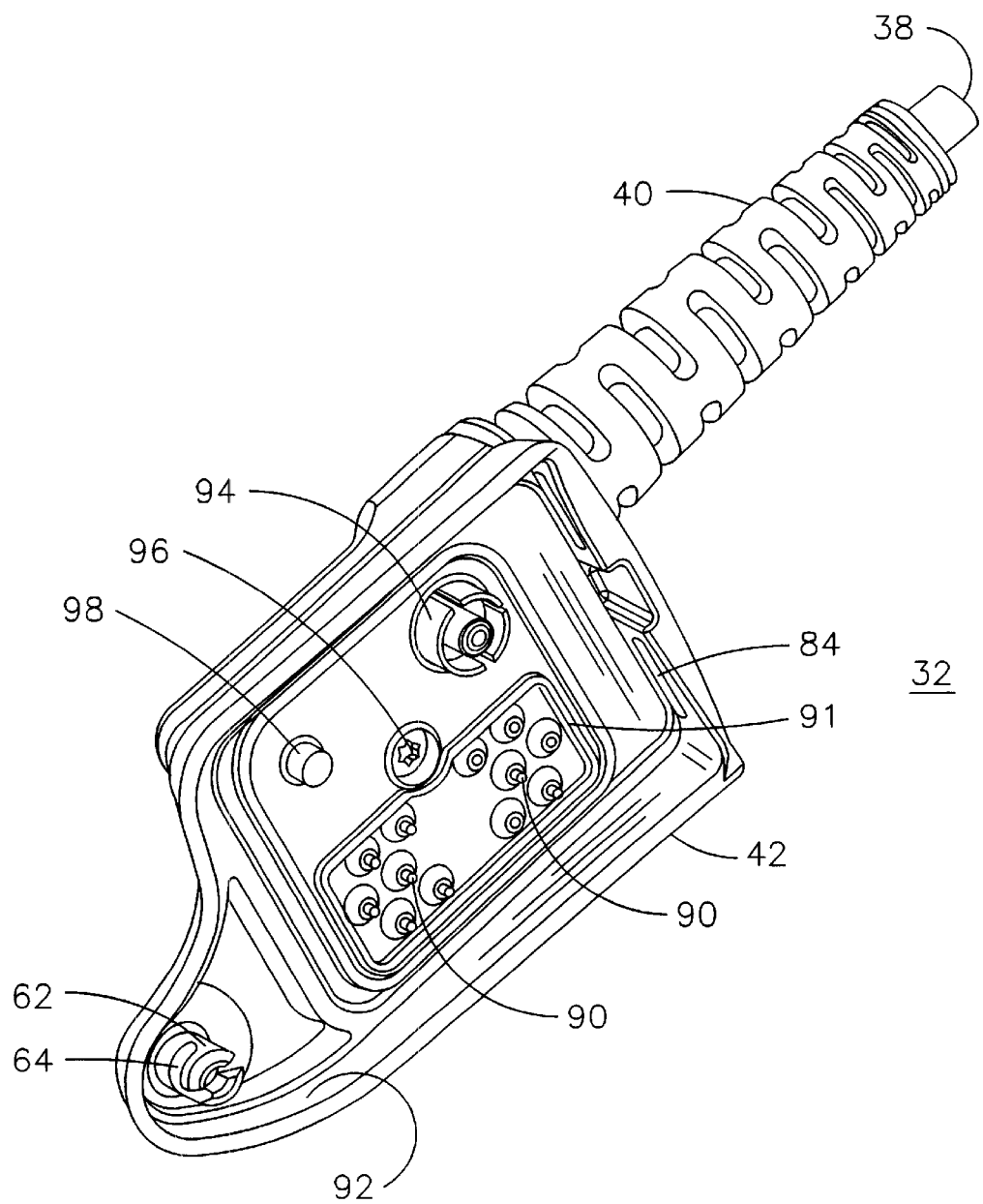
FIG. 7 is an internal view of the connector constructed according to the teachings of the present invention.

FIG. 7 illustrates an interior view of the connector 32 including several elements discussed in conjunction with previous figures. In FIG. 7, there can be seen a plurality of pins 90 for engaging in electrical connectivity the contacts 36 illustrated in FIG. 2. Also shown is a seal 91 surrounding the contacts 90. In one embodiment the seal 91 is formed of a flexible non-permeable material such as rubber. The seal 91 fits within a lip 94 (see FIG. 2), formed by recessing the plane of the electrical contacts 36 below the outermost plane of the connector 30. FIG. 7 also illustrates an RF connector 94 for a remote antenna, an assembly screw 96 (for assembling certain components of the connector 32) and an antirotation alignment pin 98.

The advantages offered by the present invention are now readily apparent. The quarter turn latching device 44 precludes over-tightening, thereby avoiding damage to the connector 32 and the connector 30. The connection process is a binary operation; the rotatable latching device 44 is either on or off. The closure force imparted to the rotatable latching device 44 is consistent from one latching operation to the next, as the user does not set the final resting position of the rotatable latching device 44. Further, the rotatable latching device 44 offers quick on/off attachment of the connector 32 to the portable radio 10. Due to the nature of the rotatable latching device 44, the amount of force required to rotate the connector 32 relative to the portable radio 10 would necessarily shear the rotatable latching device 44 before damaging the portable radio 10.

The two-point mechanism of the present invention (i.e., the rotatable latching device 44 and the tab 82/slot 84) precludes rotation of the connector relative to the portable radio 10 in the event the connector 32 is bumped or jarred. The prior art single screw attachment required the user to first align the connector and then turn the screw into place. These problems are obviated by the present invention where the tab 82 and the slot 84 serve as the first point of attachment, after which the rotation of the connector 32 brings the barrel 60 of the rotatable latching device 44 into alignment with the receiving member 50 mounted on the portable radio 10. The result is quicker connect and disconnect times and elimination of misalignment problems. Further, the connector 32 is self-aligning with respect to the connector 30 as the connector body 42 has a skirt 92 formed by extending the sidewalls of the connector body 42 beyond the place of the contacts 90. The skirt 92 mates with a raised portion 93 (See FIG. 2) of the connector 30.

It should also be noted that the prior art single screw attachment technique generally utilized a screw passing through the center of the electrical contacts 36 on the portable radio 10. This prior art embodiment required an additional seal to provide resistance from water intrusion. The integrity of the seal was determined by the torque applied to the screw. According to the teachings of the present invention, the skirt 92 together with the seal 91 protect the connectors 90 from water intrusion. Further, the rotatable latching device 44 provides a sufficient closure force to urge the seal 91 into the recess formed by the lip 94.

While the invention has been described with reference to a preferred embodiment, it will be understood by those skilled in the art that various changes may be made and equivalent elements may be substituted for elements thereof without departing from the scope of the present invention. In particular, the teachings of the present invention can be applied to a detachable connection between any two electronic devices. In addition, modifications may be made to adapt a particular situation more material to the teachings of the present invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An interconnect assembly providing electrical connection between a first electrical device and a second electrical device, comprising:
   at the first electrical device:
   a first plurality of electrical contacts;
   an alignment tab;
   a receiving member;
   at the second electrical device:
   a housing;
   a second plurality of electrical contacts located within said housing;
   a slot within said housing for pivotably engaging said tab so as to bring said second plurality of electrical contacts into alignment with said first plurality of electrical contacts; and
   a rotatable latching device for engaging said receiving member, wherein rotation of said rotatable latching device urges said first and said second plurality of electrical contacts into electrical connection and removably latches the first and the second electrical devices.

2. The interconnect assembly of claim 1 wherein the rotatable latching device has a preset rotational stop.

3. The interconnect assembly of claim 1 wherein the rotatable latching device includes a quarter turn latching device, including a screw portion on the second electrical device, wherein the receiving member is circular in shape and further includes a pin passing longitudinally therethrough, wherein said screw portion further includes an arcuate slot for engaging said pin, said arcuate slot further including a detent at the termination thereof, whereby rotation of said screw portion relative to the receiving member causes said pin to follow the curvature of said arcuate slot until said detent is reached, wherein said screw portion is detachably locked within said receiving member.

4. The interconnect assembly of claim 1 wherein the first device is a portable radio.

5. The interconnect assembly of claim 4 wherein the second device includes an accessory device for operation in conjunction with the portable radio.

6. The interconnect assembly of claim 1 including a flexible member extending around the periphery of the first plurality of electrical contacts, wherein said flexible member extends around the periphery of the second plurality of contacts when the first and the second plurality of electrical contacts are in electrical connection, thereby sealing the first and the second plurality of electrical contacts from ambient contaminants.

7. The interconnect assembly of claim 6 including a recess surrounding the second plurality of electrical contacts, wherein the flexible member fits within the recess when the first and the second plurality of contacts are urged into electrical connection.

8. The interconnect assembly of claim 6 wherein the housing extends beyond the outermost plane of the flexible member.

9. An interconnect assembly providing electrical connection between an electronic accessory device and a portable radio, comprising:
   at the portable radio:
   a first plurality of electrical contacts;
   a slot;
   a receiving member;
   at the electrical accessory device:
   a housing;
   a second plurality of electrical contacts located within said housing;
   an alignment tab on said housing for pivotably engaging said slot so as to bring said second plurality of electrical contacts into alignment with said first plurality of electrical contacts; and
   a rotatable latching device for engaging said receiving member, wherein rotation of said rotatable latching device urges said first and said second plurality of electrical contacts into electrical connection and removably latches the portable radio device and the electronic accessory device.

10. The interconnect assembly of claim 9 wherein the rotatable latching device has a preset rotational stop.

11. An accessory assembly for a portable radio having a first plurality of electrical contacts, an alignment tab, and a receiving member, said accessory assembly comprising:
    a housing;
    a second plurality of electrical contacts located within said housing;
    a slot within said housing for pivotably engaging the tab of the portable radio so as to bring said second plurality of electrical contacts into alignment with the first plurality of electrical contacts; and
    a rotatable latching device for engaging the receiving member, wherein rotation of said rotatable latching device urges said first and the second plurality of electrical contacts into electrical connection and removably latches the accessory assembly to the portable radio when rotation of said rotatable latching devices reaches a preset rotational stop.

12. The accessory assembly of claim 11 wherein the housing includes an extended skirt portion, wherein the first plurality of electrical contacts are spaced away from the portable radio body so as to create a ledge there between, and wherein said extended skirt portion envelopes the ledge when the accessory assembly is removably latched to the portable radio.

13. The accessory assembly of claim 11 including a seal surrounding the second plurality of electrical contacts, wherein a recess surrounds the first plurality of electrical contacts, and wherein said seal mates with said recess for sealing the first and the second plurality of electrical contacts from ambient contaminants when the accessory assembly is removably latched to the portable radio.

14. The accessory assembly of claim 13 wherein the mating surface of the housing extends beyond the seal.

15. An interconnect assembly providing electrical connection between a first electrical device and a second electrical device, comprising:
   at the first electrical device:
   a first plurality of electrical contacts;
   a an alignment tab;
   a receiving tab;
   a receiving member;
   at the second electrical device:
   a housing;
   a second plurality of electrical contacts located within said housing;
   a slot within said housing for pivotably engaging said tab so as to bring said second plurality of electrical contacts into alignment with said first plurality of electrical contacts; and
   a rotatable latching device for engaging said receiving member, wherein rotation of said rotatable latching device urges said first and said second plurality of electrical contacts into electrical connection and removably latches the first and the second electrical devices, wherein the rotatable latching device includes a quarter turn latching device, including a screw portion on the second electrical device, wherein the receiving member is circular in shape and further includes a pin passing longitudinally therethrough, wherein said screw portion further includes an arcuate slot for engaging said pin, said arcuate slot further including a detent at the termination thereof, whereby rotation of said screw portion relative to the receiving member causes said pin to follow the curvature of said arcuate slot until said detent is reached, wherein said screw portion is detachably locked within said receiving member.

16. An interconnect assembly providing electrical connection between an electronic accessory devise and a portable radio, comprising:
   at the portable radio:
   a first plurality of electrical contacts;
   a slot;
   a receiving member;
   at the electrical accessory device:
   a housing;
   a second plurality of electrical contacts located within said housing;
   an alignment tab on said housing for pivotably engaging said slot so as to bring said second plurality of electrical contacts into alignment with said first plurality of electrical contacts; and
   a rotatable latching device for engaging said receiving member, wherein rotation of said rotatable latching device urges said first and said second plurality of electrical contacts into electrical connection and removably latches the portable radio device and the electronic accessory device, wherein the rotatable latching device includes a quarter turn latching device, including a screw portion on the accesory device, wherein the receiving member is circular in shape and further includes a pin passing longitudinally therethrough, wherein said screw portion further includes an arcuate slot for engaging said pin, said arcuate slot further including a detent at the termination thereof, whereby rotation of said screw portion relative to the receiving member causes said pin to follow the curvature of said arcuate slot until said detent is reached, wherein said screw portion is detachably locked within said receiving member.

17. An accessory assembly for a portable radio having a first plurality of electrical contacts, an alignment tab, and a receiving member, said accessory assembly comprising:
   a housing;
   a second plurality of electrical contacts located within said housing;
   a slot within said housing for pivotably engaging the tab of the portable radio so as to bring said second plurality of electrical contacts into alignment with the first plurality of electrical contacts; and
   a rotatable latching device for engaging the receiving member, wherein rotation of said rotatable latching device urges said first and the second plurality of electrical contacts into electrical connection and removably latches the accessory assembly to the portable radio when rotation of said rotatable latching device reaches a preset rotational stop, wherein the rotatable latching device includes a quarter turn latching device, including a screw portion on the accessory assembly, wherein the receiving member is circular in shape and further includes a pin passing longitudinally therethrough, wherein said screw portion further includes an arcuate slot for engaging said pin, said arcuate slot further including a detent at the termination thereof, whereby rotation of said screw portion relative to the receiving member causes said pin to follow the curvature of said arcuate slot until said detent is reached, wherein said screw portion is detachably locked within said receiving member.

* * * * *